United States Patent

Weiss et al.

[11] Patent Number: 5,998,737
[45] Date of Patent: Dec. 7, 1999

[54] CLAMPING DEVICE

[75] Inventors: Jürgen Weiss, Esslingen, Germany; David Patrick Murray, Bristol, United Kingdom

[73] Assignee: Krone Aktiengesellschaft, Berlin-Zehlendorf, Germany

[21] Appl. No.: 08/976,242

[22] Filed: Nov. 21, 1997

[30] Foreign Application Priority Data

Nov. 22, 1996 [DE] Germany .......................... 196 50 017

[51] Int. Cl.⁶ .................................................. H01B 7/00
[52] U.S. Cl. ........................... 174/135; 174/93; 174/84 R
[58] Field of Search ................................ 174/84 R, 74 R, 174/93, 86, 87, 135; 439/607, 608, 610, 585, 460, 463, 449

[56] References Cited

U.S. PATENT DOCUMENTS

| | | | |
|---|---|---|---|
| 2,355,166 | 8/1944 | Johanson | 174/77 |
| 4,243,290 | 1/1981 | Williams | 339/143 R |
| 4,542,858 | 9/1985 | Manages | 242/54 R |
| 4,639,064 | 1/1987 | Knapp et al. | 339/89 |
| 4,657,425 | 4/1987 | Takahashi | 403/104 |
| 4,717,792 | 1/1988 | Sterritt et al. | 174/93 |
| 4,936,795 | 6/1990 | Kawai et al. | 439/609 |
| 4,938,714 | 7/1990 | Kawai et al. | 439/607 |
| 5,007,862 | 4/1991 | Defibaugh et al. | 439/607 |
| 5,307,037 | 4/1994 | Woods et al. | 335/216 |
| 5,645,450 | 7/1997 | Yamada et al. | 439/585 |
| 5,675,124 | 10/1997 | Stough et al. | 174/65 G |
| 5,807,138 | 9/1998 | Guioi | 439/610 |

*Primary Examiner*—Dean A. Reichard
*Assistant Examiner*—William H Mavo, III
*Attorney, Agent, or Firm*—McGlew and Tuttle, P.C.

[57] ABSTRACT

A clamping device, in particular a cable clamping device for telecommunications technology and data systems technology. The clamping device is of a generic type which ensures that objects having different diameters are clamped simply and reliably and without the risk of an impermissibly high degree of pinching of the object to be clamped. The clamping device includes a clamping member, which is formed from a basic body and at least one clamping arm and into which the object to be clamped is inserted. The clamping member is pushed into a sleeve having cutouts in which at least one of the clamping arms of the clamping member engages. By rotating the sleeve with respect to the fixed basic body at least one of the clamping arms reduces the clamping inside diameter of the clamping member.

20 Claims, 4 Drawing Sheets

FIG.1
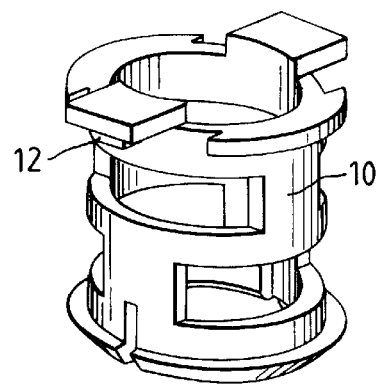
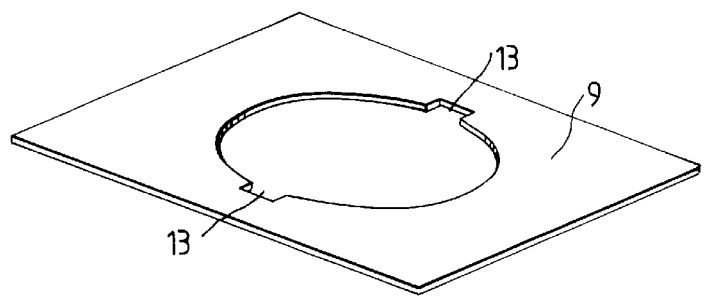
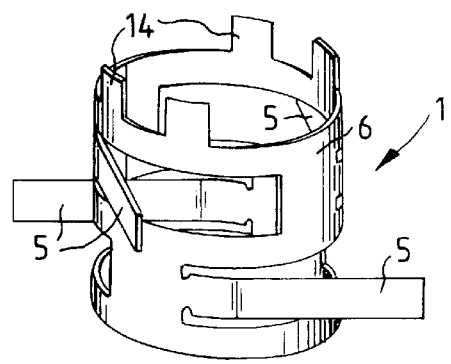
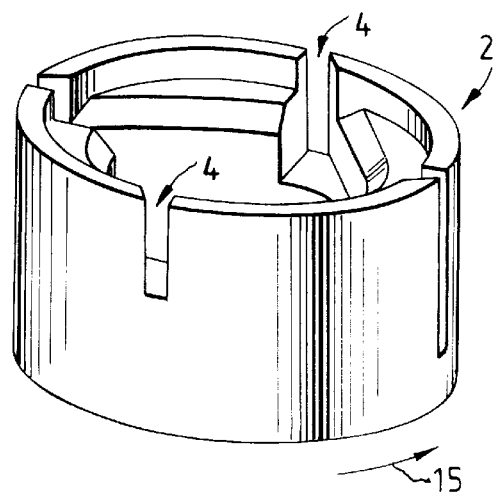

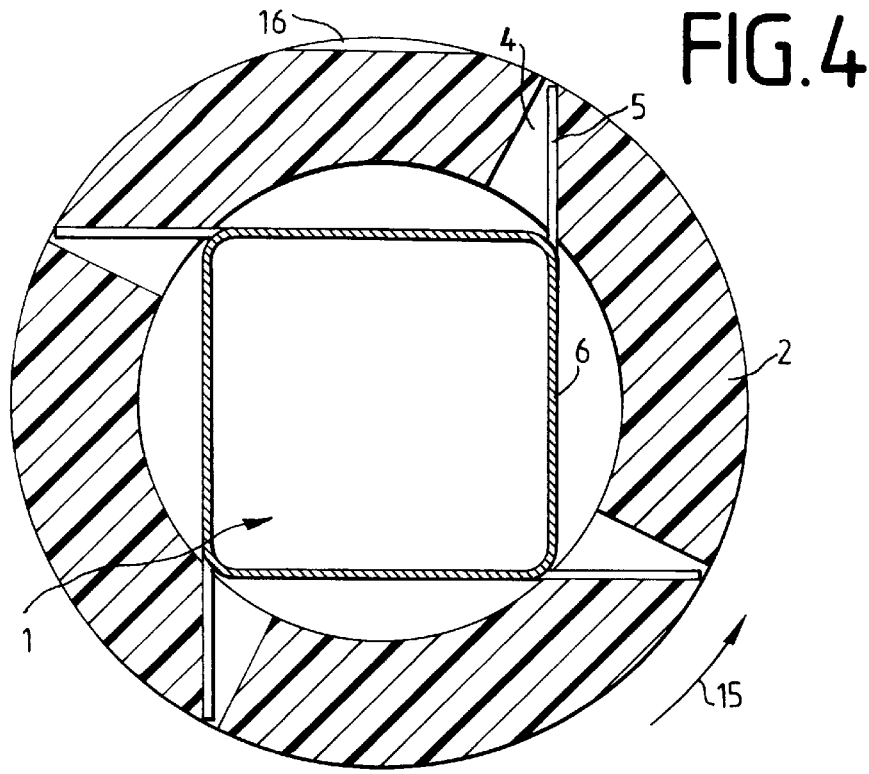
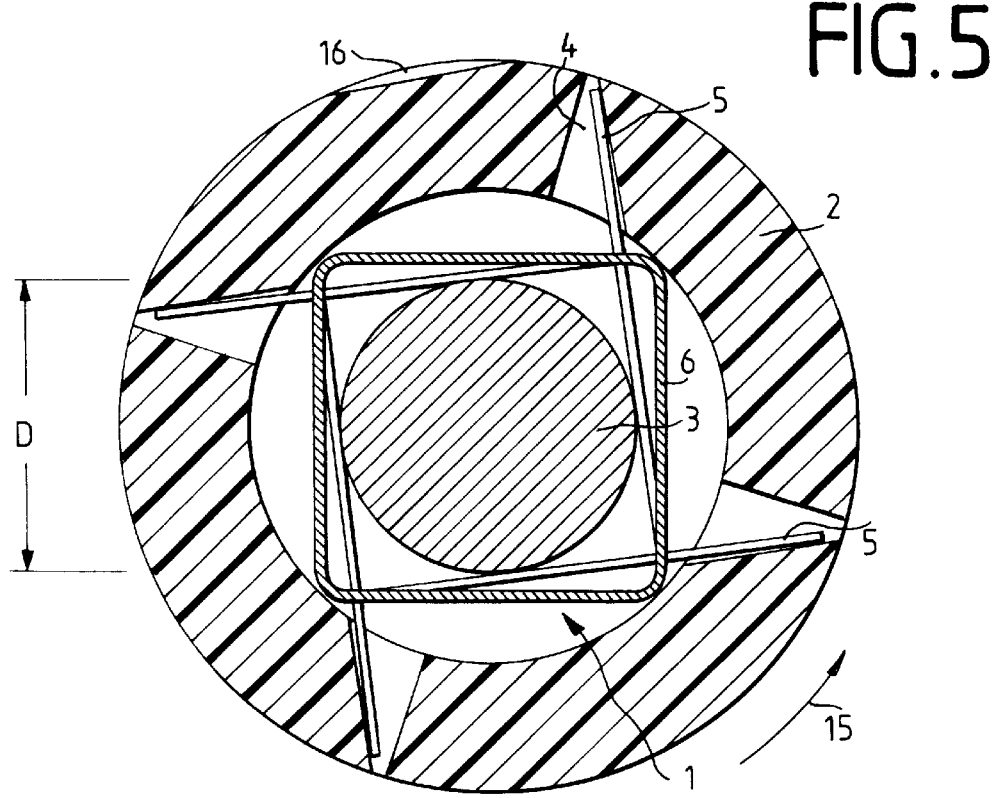

CLAMPING DEVICE

FIELD OF THE INVENTION

The invention relates to a clamping device, in particular a cable clamping device for communications technology and data systems technology.

BACKGROUND OF THE INVENTION

Known clamping devices such as pipe clips or cable clamps permit the clamping of pipes, hoses or cables only for a small range of diameters in each case. Only narrow diameter ranges can be dealt with by one clamping device. The clamped objects are not protected against being crushed; the extent of pinching is determined by the operative and is not limited by the clamping device.

DE 43 34 615 Cl describes an electric plug-in connector to which a shield contact can be clamped in order to provide continuous shielding of the cable up to the plug-in connector. The cable shield is connected in this case in a conducting fashion to the shield contact via a crimped connection. The crimped connection is undertaken by means of a crimping ring or a cable tie. It is possible to achieve only inadequate adaptation to different cable diameters by this means, as well.

SUMMARY AND OBJECTS OF THE INVENTION

It is the object of the invention to develop a clamping device of the generic type which ensures that objects having different diameters are clamped simply and reliably and without the risk of an impermissibly high degree of pinching of the object.

According to the invention, a clamping device, in particular a cable clamping device for communications technology and data systems technology is provided with a clamping member which is formed from a basic body and at least one clamping arm. Into this basic body the object to be clamped is inserted and the basic body is pushed into a sleeve having cutouts in which at least one of the clamping arms of the clamping member engages. By rotating the sleeve with respect to the fixed basic body at least one of the clamping arms reduces the clamping inside diameter of the clamping member.

In conjunction with the sleeve constructed in accordance with the invention, the clamping body constructed in accordance with the invention ensures the stress relief and/or the full-area (360°) extension of the shielding of cables with different diameters or, in general, the clamping of objects of different diameters by means of a single clamping device.

The dimensioning of the clamping arms in accordance with the intended application has the effect of exerting on the object or on a cable a defined force which cannot be exceeded, with the result that there is no risk of an impermissibly high degree of pinching of the object.

Changes in diameter of the clamping member of the clamping device are possible by a simple rotation of the sleeve over a wide range.

The clamping device accomplishes a detachable connection and can be reused.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is an exploded representation of the clamping device for cables with a round design of the clamping member;

FIG. 4 is a sectional representation of the clamping device with a square clamping member pushed into the sleeve;

FIG. 5 is a sectional representation of the clamping device according to FIG. 4, with slightly tensioned clamping arms.

DESCRIPTION OF THE PREFERRED EMBODIMENTS

Figure 2:
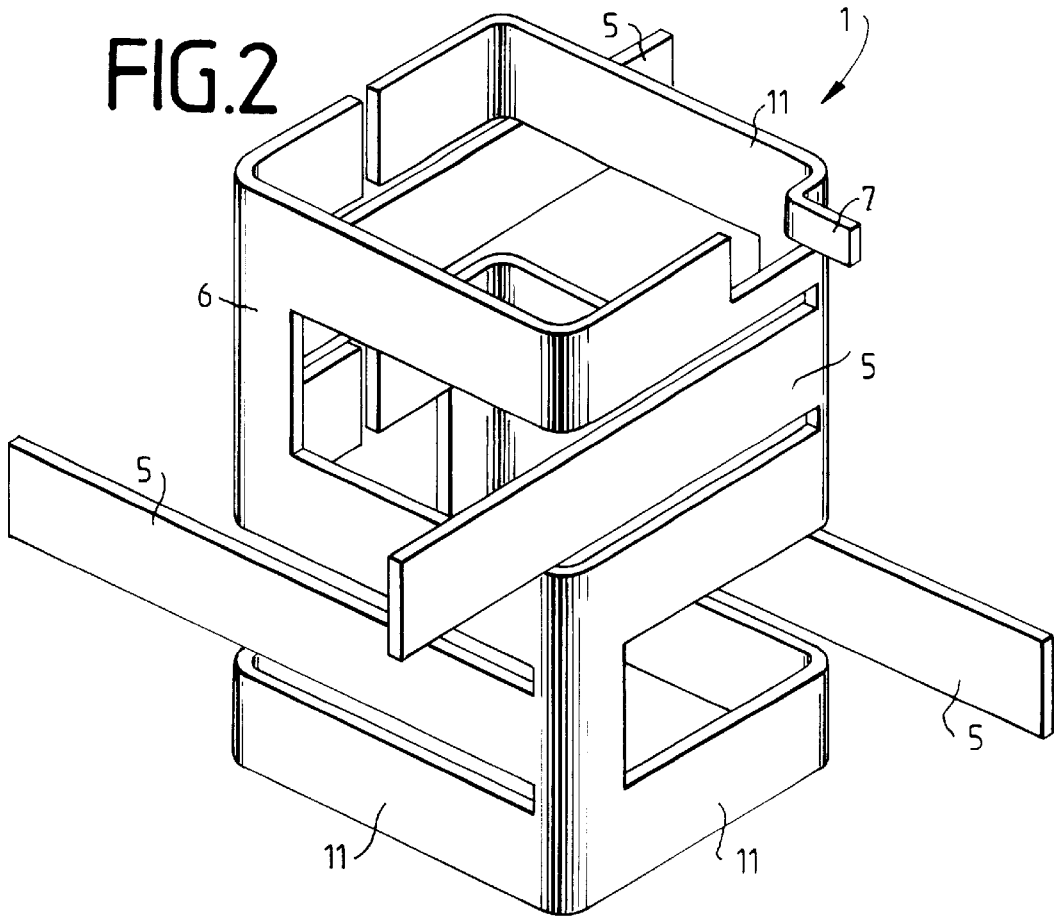
FIG. 2 is a perspective representation of a clamping body of square construction.

Referring to the drawings in particular, the invention comprises a clamping device 1. The clamping device is for cables.

In addition to its general use, the clamping device can advantageously be used, in particular, for application in telecommunications technology and data systems technology as a cable clamping device for shield cables. In conjunction with RJ 45 bushes, for example, the clamping device according to the invention ensures reliable stress relief and a full-area 360° extension of the cable shield to the bush.

Represented in FIG. 1 is a cable clamping device which essentially comprises a round clamping member 1, formed from a basic body 6 with clamping arms 5, and a sleeve 2 with cutouts 4 which are wedge-shaped from inside to outside.

The clamping device can be connected to an RJ 45 bush (not represented) via a connection plate 9 which is connected to the clamping member 1 and to its holding and reinforcing sleeve 10.

The cable shield is connected in an electrically conducting fashion to the electrically conducting clamping member 1, and the latter is connected to the shield, for example of the RJ 45 bush, via the connection plate 9, with the result that closed shielding from the cable to the bush is ensured.

The holding and reinforcing sleeve 10 is plugged through the connection plate from above such that two tongues 12 of the holding and reinforcing sleeve 10 latch into two cutouts 13 of the connection plate 9 and are thereby secured against rotation. The holding and reinforcing sleeve 10 with the connection plate 9 fastened thereto is inserted into the clamping member 1 and connected to the latter by lugs 14 which are bent over outwards, with the result that the connection plate 9 is firmly anchored on the clamping member 1. The assembly thus formed from the holding and reinforcing sleeve 10, the connection plate 9 and the clamping member 1 is pushed into the sleeve 2. The clamping member 1 is thereby fixed with respect to the sleeve 2.

Figure 6:
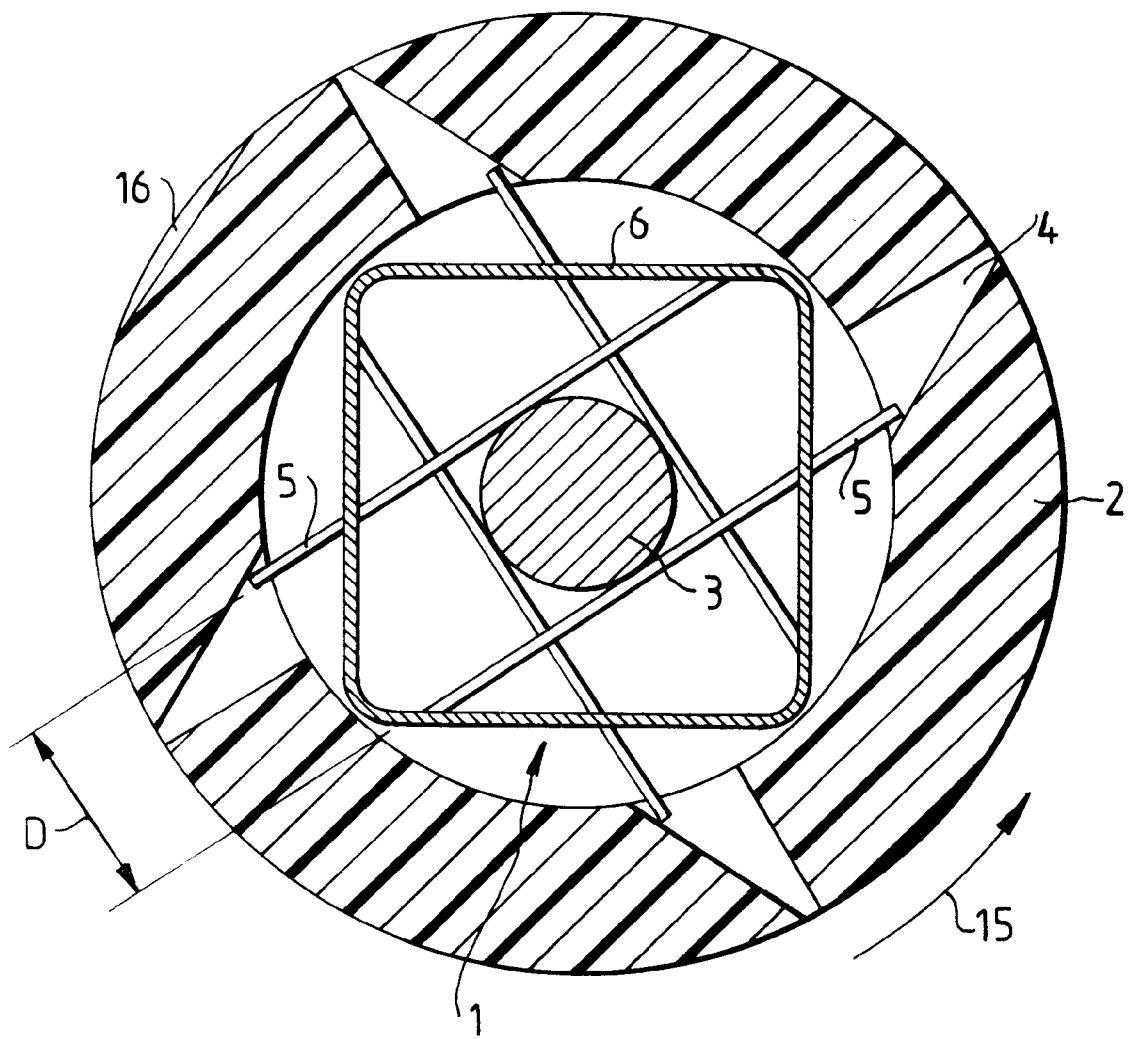
FIG. 6 is a sectional representation of the clamping device according to FIG. 4 with highly tensioned clamping arms for thin cable wires.

A cable (not represented in FIG. 1) is pushed with the an associated shield (or without this if there is no shield) into the clamping member 1 and clamped there, by rotating the sleeve 2 in the direction of the arrow 15 in an counterclockwise direction, via the clamping arms 5 of the clamping member 1, which engage in the cutouts 4 in the sleeve 2. The basic body 6 of the clamping member 1 is fixed with respect to the sleeve 2, as described above, and its position is not changed by the rotation of the sleeve 2, that is to say the basic body 6 is not rotated. The change in diameter, and thus the clamping effect on the cable, result from the reduction in diameter between the clamping arms 5 (FIGS. 4 to 6). Changes in diameter of, for example, 10 mm to 3 mm can be performed using a single embodiment.

The clamping member 1 is shown in a square embodiment in FIG. 2. The basic body 6 is formed from movable arms 11 which are connected to one another (in a unipartite fashion or else, for example, by hinges such as film hinges). Four clamping arms 5, for example, are formed from the basic body 6 in four different planes, for example by punchings.

Figure 3:
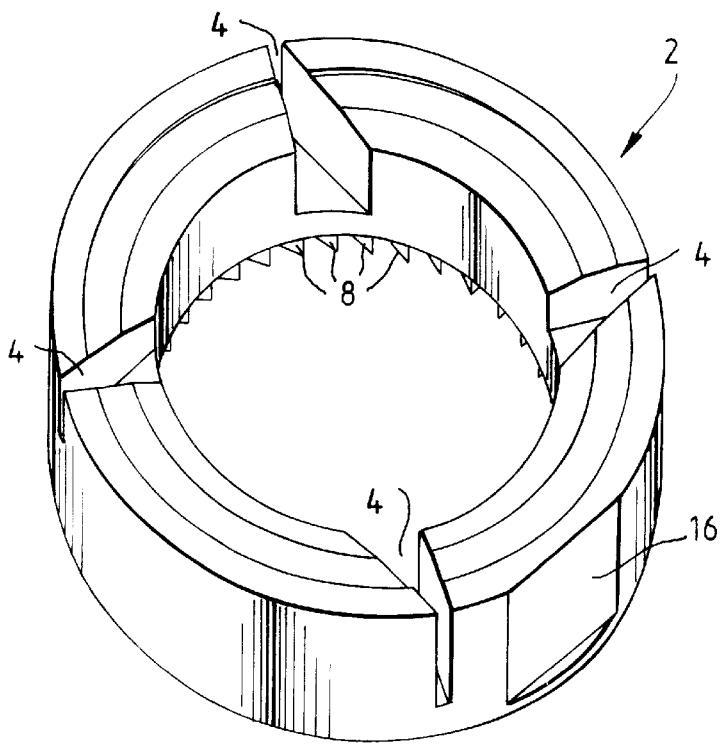
FIG. 3 is the perspective representation of the sleeve.

Bent out of one of the arms 11 is a ratchet 7 which, after the insertion of the clamping member 1 into the sleeve 2 according to FIG. 3, engages in inner teeth 8 of the sleeve 2, and when the sleeve is rotated, effects additional locking of the clamping member 1 in a desired position in the sleeve 2.

FIG. 3 also shows four wedge-shaped cutouts 4 in which the four clamping arms 5 of the clamping member 1 (FIG. 2) engage.

The clamping device is shown in the assembled state in FIG. 4. The clamping member 1 is inserted into the sleeve 2, and the clamping arms 5 are located essentially free from stress in the cutouts 4.

A flat 16 which can be seen on the upper rim of the sleeve 2 (FIGS. 3 to 6) serves to orientate the position of the sleeve 2.

FIG. 5 shows the clamping device with an inserted cable 3 of the maximum possible diameter. The sleeve 2 is rotated as far as permitted by the cable diameter, in order to tension or clamp the cable 3. As a result, the clamping arms 5 of the clamping member 1 are tensioned and exert a corresponding pressure on the lateral surfaces of the cutouts 4 in the sleeve 2.

The clamping device is shown in FIG. 6 with an inserted cable 3 which has a small diameter. In order to tension the cable 3, the sleeve 2 is rotated so far that the clamping arms 5 of the clamping member 1 still just hold in the cutouts 4 of the sleeve 2. The basic body 6, serving as a frame, of the clamping member 1 remains clearly unchanged, while the clamping arms 5 are pushed together by the rotation of the sleeve 2 and effect the clamping of the cable 3. The point of connection between the respective clamping arms 5 and the basic body 6 in this case forms the respective fulcrum for the clamping arms 5 to be rotated together in the counterclockwise sense in the direction of the arrow 15 to form a new clamping diameter D.

The clamping device can be produced from a suitable plastic, the clamping member 1 being metallized or produced from an electrically conducting material if the clamping device is provided as a cable clamping device for the purpose also of extending the cable shield.

The sleeve 2 can be provided on the outside with gripping hollows.

While specific embodiments of the invention have been shown and described in detail to illustrate the application of the principles of the invention, it will be understood that the invention may be embodied otherwise without departing from such principles.

What is claimed is:

1. A clamping device, comprising:
    a sleeve defining a cutout;
    a clamping member rotatably positionable in said sleeve, said clamping member including a body and a clamping arm, an object to be clamped being insertable into an inside diameter of said clamping member, said clamping arm being engagable with said cutout in said sleeve, said clamping arm and said body being shaped and formed of a material to cause said clamping arm to reduce said inside diameter of said clamping member when said sleeve is rotated with respect to said clamping member.

2. The device in accordance with claim 1, wherein:
    said clamping arm is movable from an outer radial position to an inner radial position by rotation of said sleeve with respect to said clamping member to reduce said inside diameter of said clamping member.

3. The device in accordance with claim 2, wherein:
    said clamping arm extends circumferentially outward from said inside diameter.

4. A clamping device, in particular a cable clamping device for communications technology and data systems technology, comprising:
    a clamping member including a basic body and at least one clamping arm, an object to be clamped being inserted into said clamping member; and
    a sleeve, said clamping member being pushed into said sleeve for use, said sleeve having cutouts in which said at least one clamping arm of said clamping member engages, rotation of said sleeve with respect to said basic body causes said at least one clamping arm to reduce a clamping inside diameter of said clamping member.

5. The clamping device according to claim 4, wherein said at least one clamping arm comprises a plurality of clamping arms which are led out of the clamping member in different planes.

6. The clamping device according to claim 4, wherein the at least one clamping arm is a plurality of punched clamping arms, said clamping member is a unipartite punched part with a plurality of punched clamping arms.

7. The clamping device according to claim 4, wherein said clamping member forms an electrically conducting shield contact.

8. The clamping device according to claim 4, wherein said clamping member has a ratchet which engages in inner teeth of said sleeve.

9. The clamping device according to claim 4, further comprising: a holding and reinforcing sleeve inserted into said basic body of the clamping member.

10. The clamping device according to claim 4, wherein said basic body of said clamping member is of a round shape.

11. The clamping device according to claim 4, wherein said basic body of said clamping member is of polygonal shape.

12. The device in accordance with claim 4, wherein:
    said at least one clamping arm is movable from an outer radial position to an inner radial position by rotation of said sleeve with respect to said clamping member to reduce said inside diameter of said clamping member.

13. A clamping device, comprising:
    a clamping member including a basic body and at least one clamping arm, an object to be clamped being inserted into said clamping member;

a sleeve having cutouts, said clamping member being pushed into said sleeve for use; and diameter adjustment means including said cutouts and said at least one clamping arm, said at least one clamping arm engaging at least one of said cutouts for reducing a clamping inside diameter of said clamping member upon rotating said sleeve with respect to said basic body.

14. The clamping device according to claim 13, wherein said at least one clamping arm comprises a plurality of said clamping arms which extend out of the clamping member in different planes.

15. The clamping device according to claim 13, wherein said clamping member forms an electrically conducting shield contact.

16. The clamping device according to claim 13, wherein said clamping member has a ratchet which engages in inner teeth of said sleeve.

17. The clamping device according to claim 13, further comprising:

a holding and reinforcing sleeve inserted into said basic body of the clamping member, said holding and reinforcing sleeve defining a cutout for passage of said clamping arm.

18. The device in accordance with claim 13, wherein:

said diameter adjustment means includes a shape and a material of said body and at least one clamping arm to cause said at least one clamping arm to reduce said inside diameter of said clamping member when said sleeve is rotated with respect to said clamping member.

19. The device in accordance with claim 13, wherein:

said at least one clamping arm is movable from an outer radial position to an inner radial position by rotation of said sleeve with respect to said clamping member to reduce said inside diameter of said clamping member.

20. The device in accordance with claim 13, wherein:

said at least one clamping arm extends circumferentially outward from said inside diameter.

\* \* \* \* \*